US011933649B2

(12) United States Patent
Bavar et al.

(10) Patent No.: US 11,933,649 B2
(45) Date of Patent: Mar. 19, 2024

(54) MEASURING DEVICE WITH SELF-POWERING ANNULAR TURBINE

(71) Applicant: TASK FORCE TIPS, LLC, Valparaiso, IN (US)

(72) Inventors: Travis Bavar, Valparaiso, IN (US); Ryan Smaga, Valparaiso, IN (US); Robert W. Steingass, Valparaiso, IN (US); Kent Kekeis, Valparaiso, IN (US)

(73) Assignee: TASK FORCE TIPS, LLC, Valparaiso, IN (US)

( * ) Notice: Subject to any disclaimer, the term of this patent is extended or adjusted under 35 U.S.C. 154(b) by 345 days.

(21) Appl. No.: 17/599,918

(22) PCT Filed: Apr. 10, 2020

(86) PCT No.: PCT/US2020/027607
§ 371 (c)(1),
(2) Date: Sep. 29, 2021

(87) PCT Pub. No.: WO2020/210584
PCT Pub. Date: Oct. 15, 2020

(65) Prior Publication Data
US 2022/0057239 A1    Feb. 24, 2022

Related U.S. Application Data

(60) Provisional application No. 62/831,890, filed on Apr. 10, 2019.

(51) Int. Cl.
*G01F 1/115*    (2006.01)
*A62C 33/00*    (2006.01)
*H02K 7/18*    (2006.01)

(52) U.S. Cl.
CPC ............. *G01F 1/115* (2013.01); *A62C 33/00* (2013.01); *H02K 7/1823* (2013.01)

(58) Field of Classification Search
CPC ......... A62C 33/00; A62C 27/00; A62C 37/50; H02K 7/1823; F03B 13/00; F03B 13/264;
(Continued)

(56) References Cited

U.S. PATENT DOCUMENTS 5,935,426 A      8/1999 Giordano et al.
8,544,346 B2 *  10/2013 Peleg ....................... H02K 7/11
73/861.79
(Continued)

FOREIGN PATENT DOCUMENTS

WO   WO-2012/131677 A2   10/2012
WO   WO-2018/222040 A1   12/2018

OTHER PUBLICATIONS

International Application No. PCT/US2020/027607, International Search Report and Written Opinion, dated Jul. 2, 2020.

*Primary Examiner* — Nathaniel T Woodward
(74) *Attorney, Agent, or Firm* — MARSHALL, GERSTEIN & BORUN LLP (57) ABSTRACT

The disclosed portable self-powered flow measuring device has a non-metallic housing through which a fluid flows. An annular turbine spins within the housing, and has a set of inwardly-extending vanes set to reduce the pressure of the flowing fluid by more than 10%. A set of magnets that are spaced circumferentially about the turbine. Coils are mounted to the housing with axes that are radial to the axis of the central waterway. A set of circumferentially spaced reinforcing arms, one for each coil, are positioned outside the coils, the circumferential width of each reinforcing arm near the axial position of the turbine being no more than the radius of the coil.

15 Claims, 11 Drawing Sheets

(58) Field of Classification Search
CPC ...... F03B 17/061; F03B 17/063; F03B 11/02; F03D 1/04; F01D 15/10; A01G 25/16; G01F 1/115; G01F 1/10
See application file for complete search history.

(56) References Cited

U.S. PATENT DOCUMENTS

| | | |
|---|---|---|
| 9,295,863 B2 | 3/2016 | McMillan et al. |
| 2003/0033971 A1 | 2/2003 | Donehue |
| 2008/0307897 A1 | 12/2008 | Peleg |

\* cited by examiner

|  | Device A | Device B | Device C |
|---|---|---|---|
| Waterway Diameter (in) | 1.5 [38.1 mm] | 2.5 [63.5 mm] | 2.5 [63.5 mm] |
| Minimum Flow (GPM) | 50 [200 LPM] | 100 [400 LPM] | 500 [2,000 LPM] |
| Minimum RPM | 766 | 709 | 1772 |
| Maximum Flow (GPM) | 300 [1,200 LPM] | 500 [2,000 LPM] | 1,250 [5,000 LPM] |
| Maximum RPM | 6,903 | 4,447 | 4,667 |
| Pitch Angle α (deg) | 30 | 45 | 25 |
| Number of Vanes | 8 | 8 | 4 |
| Vane Projection (in) | .25 [6.4 mm] | .415 [10.5 mm] | .40 [10.2 mm] |

|  | Device A | Device B | Device C |
|---|---|---|---|
| Peak Voltage at Minimum Flow (VAC) | 6.4 | 6 | 14.9 |
| Peak Voltage at Maximum Flow (VAC) | 62.5 | 40 | 36.9 |
| Mininum Peak DC Current (mA) | 30 | | |
| Maximum Peak DC Current (mA) | 30 | | |
| Magnet Grade | N52 | | |
| Magnet Dimensions (in) | .5 [12.7 mm] X .25 [6.4 mm] | | |
| Gauss | 144,000 | | |
| Number of Magnets | 4 | 6 | 4 |
| Magnet Polarity | Alternating | | |
| Coil Gauge (awg) | 34 | | |
| Coil Turns | ~ 750 | | |
| Coil O.D. (in) | 1.83 [46.5 mm] | | |
| Coil I.D. (in) | 1.17 [29.7 mm] | | |
| Coil Thickness (in) | .15 [3.8 mm] | | |
| Coil Resistance (ohms) | ~ 80 | | |
| Dist. between Magnet Pole and Coil (in) | .1825 [4.6 mm] | | |

MEASURING DEVICE WITH SELF-POWERING ANNULAR TURBINE

FIELD OF THE INVENTION

The present invention relates to a novel portable flow and/or pressure measurement device that when combined with additional local and remote computing devices (real or virtual), can form a network that collects, manipulates, distributes, and presents measurement data. The same network can also collect, manipulate, distribute, and present other data such as operating conditions, configurations and settings of devices, use instructions, marketing and sales information, educational materials, and diagnostic and maintenance information and data. More particularly, the invention relates to a wire-free, self-powered (energy harvesting) flow and/or pressure measurement device for water-based liquids in firefighting and emergency service applications.

The present invention extends the usefulness of the haptic flowmeter described in our U.S. Pat. No. 9,295,863 by providing a wire-free, self-powered flow measuring device.

BACKGROUND OF THE INVENTION

In the firefighting environment, it is vitally important to know how much water is being put on a fire to in the effort to extinguish it. This is a real-time activity during the firefight. Flow and pressure determine how much water is being supplied to the fire and how optimally it is being delivered. To make sound decisions based on basic firefighting principles and training, firefighters require the most accurate information related to the flow and pressure of the water being delivered to the fire.

This information is sometimes needed by multiple people with different needs. The firefighter may need flow data related to his or her nozzle. The pump operator may need flow and pressure data to compensate for pressure loss. The commanding officer may need flow data for of all lines simultaneously to assist in balancing loads. Each scenario and fire can be different, but one basic requirement that is needed in all scenarios is to have the best flow, pressure, time, and location data available in real time and stored for subsequent reference after the emergency incident.

It is also advantageous to be able to document both how much water was used as well as the timing of that use. This use and timing data can be used to analyze the procedure/effort of the firefighting and for associated learning and training. Also, the data can be used by municipalities to determine how much should be paid for water usage in areas where water companies charge for water use. Additionally, this data could be used for liability defense to help protect the municipality or fire company from financial claims in lawsuits that claim improper or negligent firefighting procedures.

The effects of flow and pressure is a key concept that needs to be internalized when training firefighters. Demonstration is the best method for this. Current methods for demonstrating flow and pressure rely on either battery powered devices that are permanently installed into the piping of trucks, or portable devices that have integrated displays and accuracies that are often suspect. They are difficult to use for larger groups. In training, it would be ideal if every student had an individualized record or display of the flow and pressure in their own hand. An ideal tool for displaying that data is their own personal smartphone. When the student can use their own smartphone to access data pertaining to the flow that past their own hands, a system can be arranged so that the student can use that same smartphone to obtain directed helpful information from the measuring device application. This information could be additional analysis tools of the data, training videos, correct nozzle selection information, and other information that could make their training and day-to-day efforts more effective.

Communicating the critical flow and pressure data is conventionally dependent on human interaction, the environment, the recipient's interpretation, and availability of both the sender and the recipient to communicate. These conditions are rarely reliable or consistently available. The nozzle operator, pump operator, and commanding officer need to share this information on a real time basis, most often over noisy radios, relayed from person to person or at its most basic form, yelled across a fire scene. It would be ideal if this data and information to make better decisions quicker was available instantly to all interested parties without human interpretation or incomplete information.

During a firefighting event, the crisis environment surrounding that event requires that everyone in the firefighting role be focused on the job at hand. Extinguishing the fire. There is little time for analysis of decision-making or flow-and-pressure selection. Capturing the flow data over time during the event would be ideal. If the flow and pressure data is captured with a time stamp and other critical information, the firefighters could review this information later, when the crisis is over, and when they are in a frame of mind to review and analyze the events more effectively. This real-world analysis could be the most ideal training tool of all.

Often times, it is questioned when the fire department started flowing water, how much they flowed, and if the flow was sufficient. Quite often, witnesses' recollection of events and timing is skewed by adrenalin and crisis. Those affected often think that enough wasn't done to extinguish the fire. They want to blame someone for the catastrophe of a fire and they often lash out at the people who tried to help. They may file a lawsuit to assign blame and make liability claims against the department. The same flow and pressure data collected for training purposes could also be effective at unequivocally demonstrating the timing and details of events that happened at the scene in the defense of a lawsuit or other liability investigation.

It is becoming more and more important to track how much water was used at a fire scene. As one example, the water utility sometimes charges for the water usage. The amount charged is typically unverifiable and disputes are often mediated in favor of the charging entity. Having factual flow data makes the water use data auditable, and thus more reliable. As another example, firefighting water flows often create run-off of chemicals that may be harmful to the environment. To help mitigate these effects, it is important to know how much water was flown, how much was recovered, and how much remains. Dilution or addition of counteractive chemicals are two ways of mitigating the harmful chemical effect. To effectively apply the right amount of dilution or chemical agent, one needs to know how much chemical was released and how much dilution already exists as a result of the firefighting.

Conventional battery-powered portable flowmeters and flowmeters permanently installed into the piping of a fire engine are not equipped to establish communications networks to convey flow, pressure, time, or location data to those outside the immediate vicinity of the display. Even if they were enabled with smartphone wireless connectivity to record and transmit such data to others, or to cloud storage, they would be of little use in some important situations, such as a high-rise fire. There, the data available in conventional devices is of limited value because:
1. Flow to each hose used in a high-rise fire is typically discharged from a standpipe to a fire hose, and to the fire. If a building is on fire, water entering the standpipe may be distributed to multiple hoses so it's not possible to tell the flow or pressure being delivered to a particular hose crew. Each hose crew acts as if the standpipe is a fire engine discharge. Any flow/pressure measuring equipment permanently installed in a fire truck discharge port can't be used on a high rise fire because a fire truck can't be brought up many flights of stairs.
2. Current battery operated flowmeters (i.e., the current Elkhart Brass model) have drawbacks limiting their usefulness in high-rise fires. Their flowmeter is longer, bigger and heavier, making it undesirable to carry up multiple floors of stairs to a fire. Furthermore, batteries pose run-time limitations even when only powering a local display. Less run-time is possible when powering networks via wireless communication. Firefighters know from experience that the use of batteries in seldom-used equipment can make unreliability suspect, and thus fear the consequence of dead batteries. The self-powered device of the present invention is always ready to go.

Use of portable wire-free, self-powered flowmeters are advantageous in other locations not accessible by fire trucks, such as delivering water from remote water sources to tankers. You can know in real-time as each tanker is filled both locally and remotely.

The use of individual, self-powered devices can also be beneficial when forestry firefighters deliver water from a portable pump directly to the firefighters through long lengths of hose in rugged wilderness. The incident commander can knows what each crew is doing in real-time, as could USFS headquarters located in a different state. Those types of firefights can last for days or weeks, making replacement of flowmeter batteries a conundrum.

In active firefighting environments, it is often difficult to see a measuring device or read its display. It is advantageous to know that the unit is operating without the need to see a display. A unique feature of the self-powered measuring device described here is that it can provide haptic feedback in the form of vibration generation. When the device is generating power, it intrinsically generates a vibration "signature". This vibration signature tells the operator that this device is operating and that it should be generating data and transmitting it as expected.

Sometimes it is important to know where water is being flowed when fighting fires. The bigger the fire, the more important flow location may be to the commander. The described measuring device can configured to self-locate and provide location data with the other data being collected.

In another case, firefighting often requires mixing of chemicals with the water flow to create foam or other liquid or semi-liquid mixtures. This measurement device could allow one to quantify the flow as described and send a signal to one or more controllers to meter the introduction of a secondary or more chemicals based upon the flow rates.

There are many flow and/or pressure measuring tools available in the fire market. There are also many fire training tools available in the fire market, some on a smartphone. There are water use databases in the water market. There aren't any flow and/or pressure measurement devices for water based liquids in industries such as firefighting, municipal water supply, and other industrial applications that—when combined with additional local and remote computing devices—can form a network that collects, manipulates, distributes, and presents measurement data. There are no networks that collect, manipulate, distribute, and present data such as operating conditions, configurations and settings of devices, use instructions, marketing and sales information, educational materials, and diagnostic and maintenance information and data.

This specification describes embodiments of the new invention. Other embodiments of the invention and modifications of the disclosed embodiments will be apparent to those skilled in the art.

Having a stand-alone meter is oftentimes the preferred design. However, there are applications in which it would be better to include the measuring device as an integrated part of an existing firefighting device such as a nozzle, water monitor, or other water flow control device. This would eliminate the need of having to handle a separate product.

SUMMARY OF THE DISCLOSURE

The disclosed embodiment of the invention is a wire-free, self-powered flow and/or pressure measuring device and/or system that harvests power from liquid moving through its center waterway. Power is harvested by rotating an annular (hollow) turbine within the device. The turbine has magnets that move past coils to generate a voltage that is proportional to the peripheral speed of the magnet turbine assembly.

The device uses a combination of polymeric and metal components to reduce RF inefficiencies that could otherwise arise due to reflection, absorption, and attenuation of the RF waves, while simultaneously maintaining sufficient strength to maintain structural integrity of the device when in use or during hydrostatic test conditions.

One goal was to produce the necessary power for transmitting flow data efficiently, using a combination of non-metallic and metallic components so as to avoid drag-producing eddy currents resulting from the magnets moving within the confines of a metallic enclosure. The abundant power that can be achieved using the invention can eliminate the need for batteries and enable portability by minimizing device size and weight, minimizing the cost of magnets and coils, and enabling the selection of robust electronics and wireless transmitters or transceivers for communication to external devices such as smartphones.

The disclosed embodiment of the invention shows a wire-free, self-powered flow and/or pressure measuring device for firefighting that is powered by liquid moving through an annular turbine that is encircled by three concentric layers:

A first layer; a plastic housing that restrains fluid pressure within a central waterway, has at least one recess for holding one coil for electric generation, and forms at least one bearing race for rotation of the turbine without inducing significant eddy current loss from the turbine's permanent magnets acting upon the housing, and A second layer; an aluminum cage that restrains axial loads from pressure in the central waterway, and can provide mount structure for an entrance connection to and for a discharge connection from the central waterway, This layer includes one or more arms to prevent pressure within the housing from causing radial rupture at the coil recess. Windows between each arm help to inhibit eddy current losses; and A third layer; a plastic cover that forms a durable waterproof electronics chamber by enclosing a chamber bounded by the cage, the housing and a cap. Radio signals freely transmit through this layer through, and it does not foster the production of eddy currents.

Other possible advantages will be apparent from the detailed description.

DETAILED DESCRIPTION

Referring to FIGS. 1 through 4, the disclosed wire-free, self-powered flow and/or pressure measuring device 1 is designed to harvest electric power from liquid moving through its central waterway 2. An inlet connection 3 and an outlet connection 4 enable the device to be interconnected to a hose or pipe in a firefighting arrangement.

Figure 1:
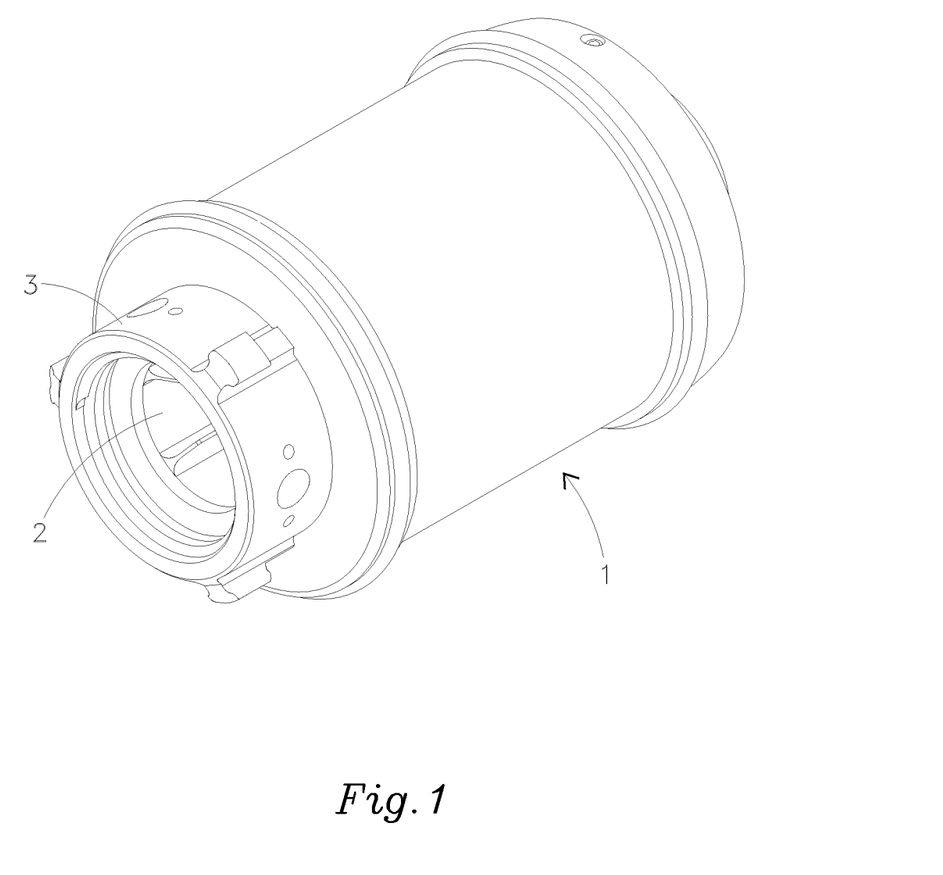
FIG. 1 is an isometric exterior view of one embodiment of a new wire-free, self-powered flow and/or pressure measuring device that uses the invention.
Figure 2:
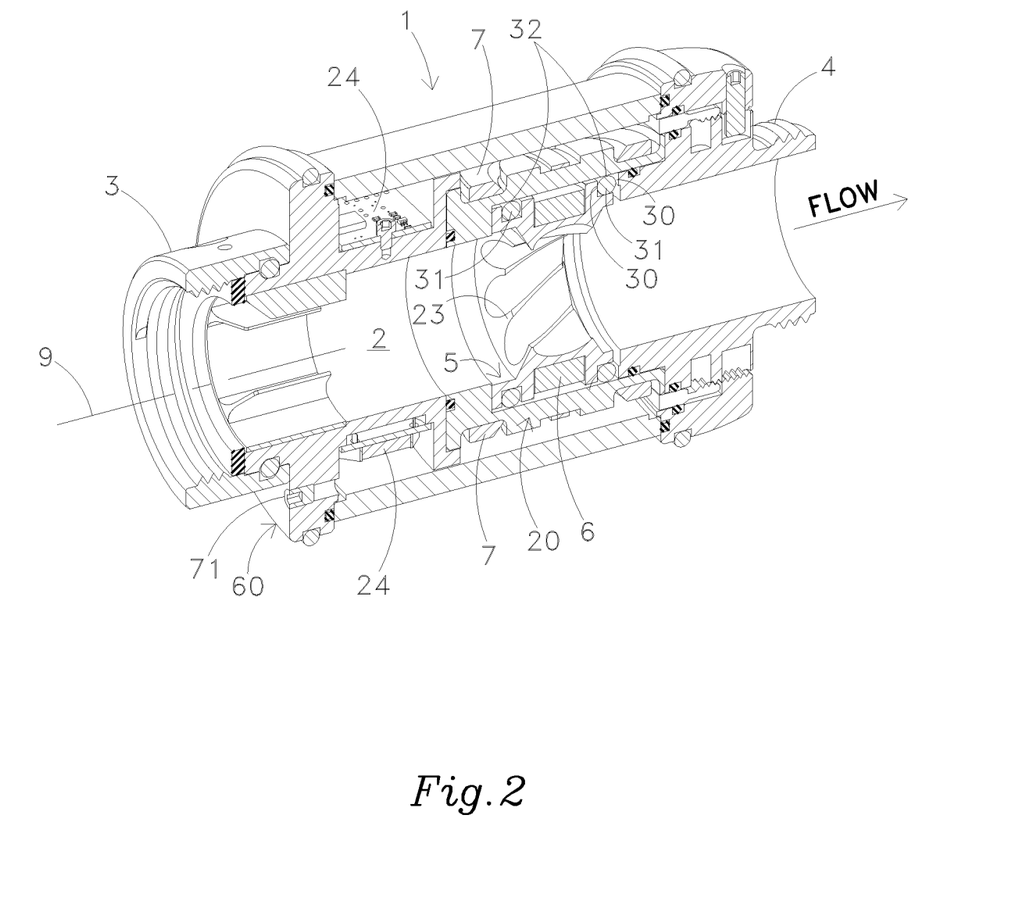
FIG. 2 is an isometric cross sectional view along the central axis of the device shown in FIG. 1.
Figure 3:
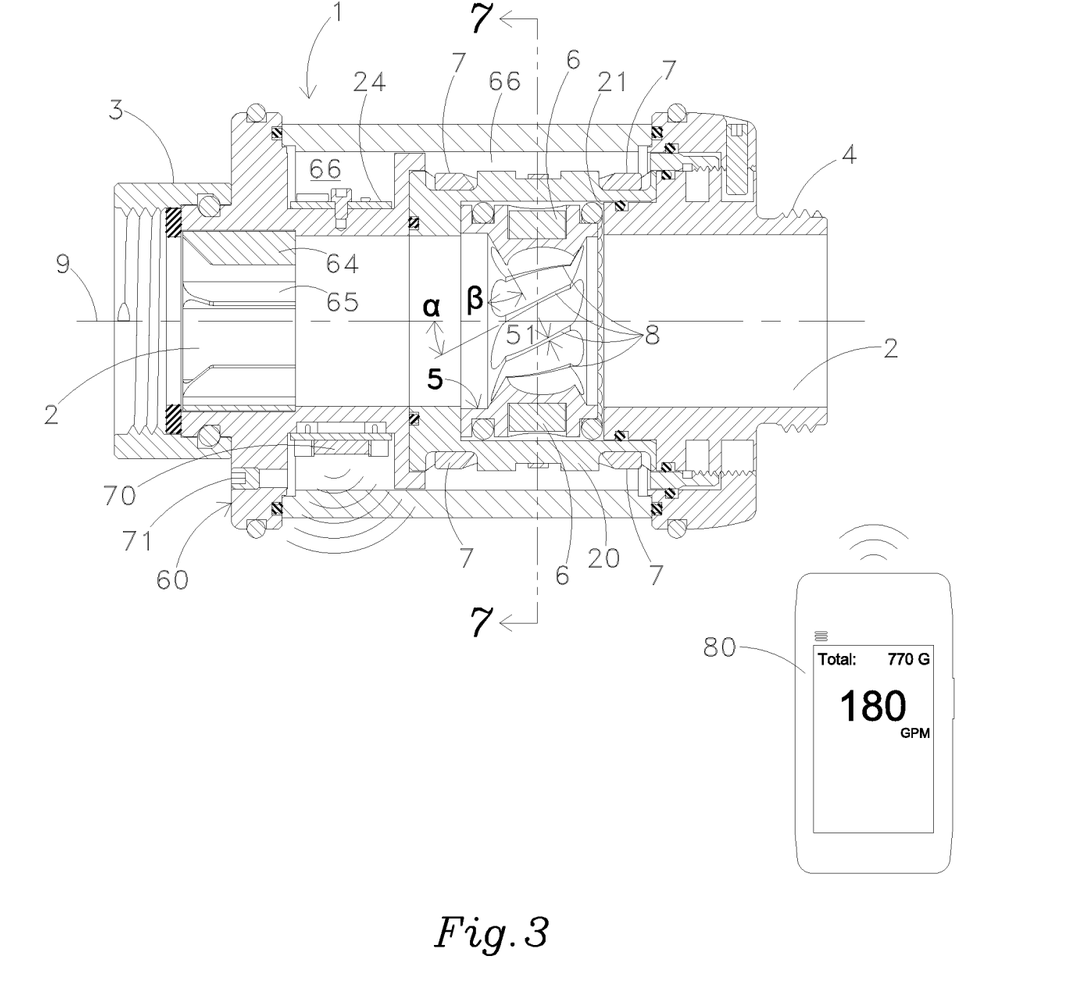
FIG. 3 is a plan view of the device shown in FIG. 2, and includes a depiction of a smartphone wirelessly paired to the device.
Figure 4:
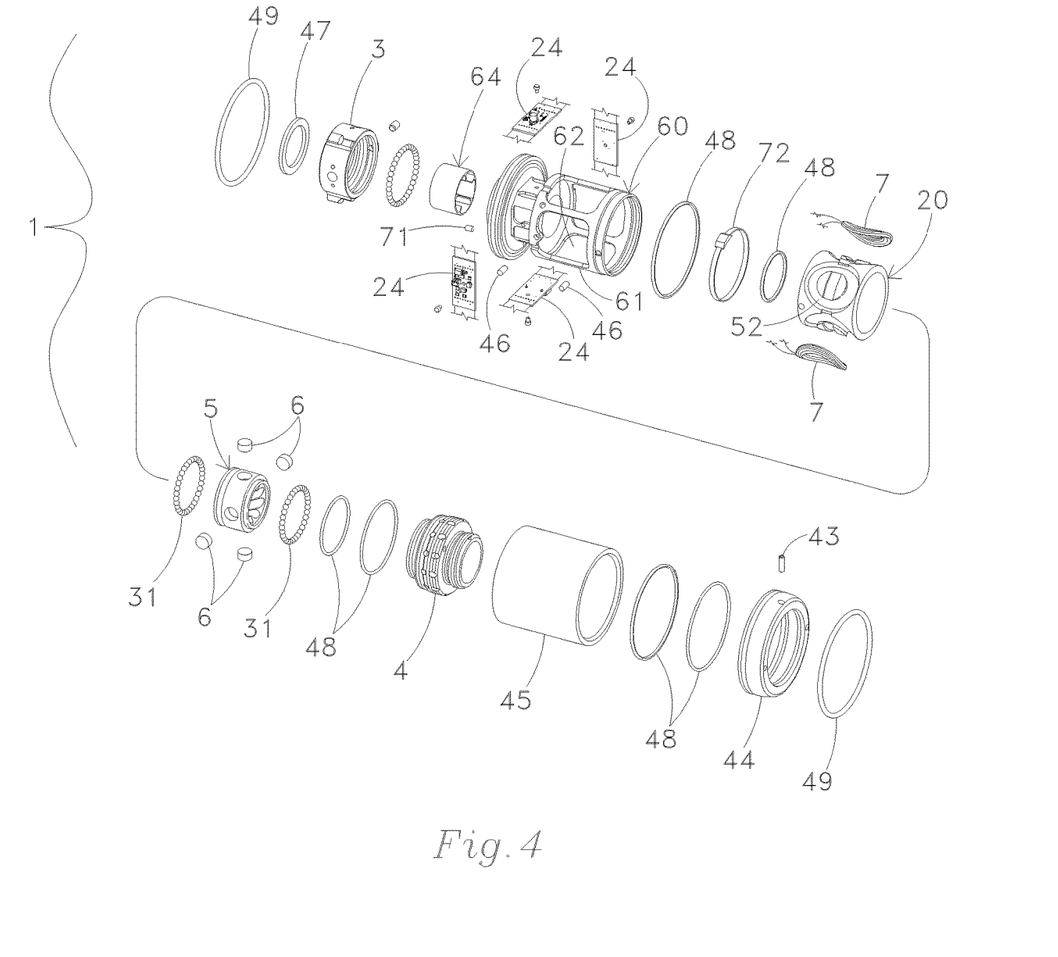
FIG. 4 is an exploded isometric view of the device shown in FIG. 1.

Referring to FIGS. 2 through 4, power is harvested from water flowing through a central waterway 2 in the device 1 when the flow causes an annular turbine 5 within the device to rotate. The turbine has permanent magnets 6 that move past coils 7 to generate a voltage that is proportional to the peripheral speed of the magnet. The magnets 6 are preferably Grade N52 rare earth cylindrical magnets with axial polarization, permanently installed in the turbine with alternating coil facing poles using an epoxy or urethane adhesive capable of resisting centrifugal forces, vibration, temperature changes, and corrosion.

Figure 5:
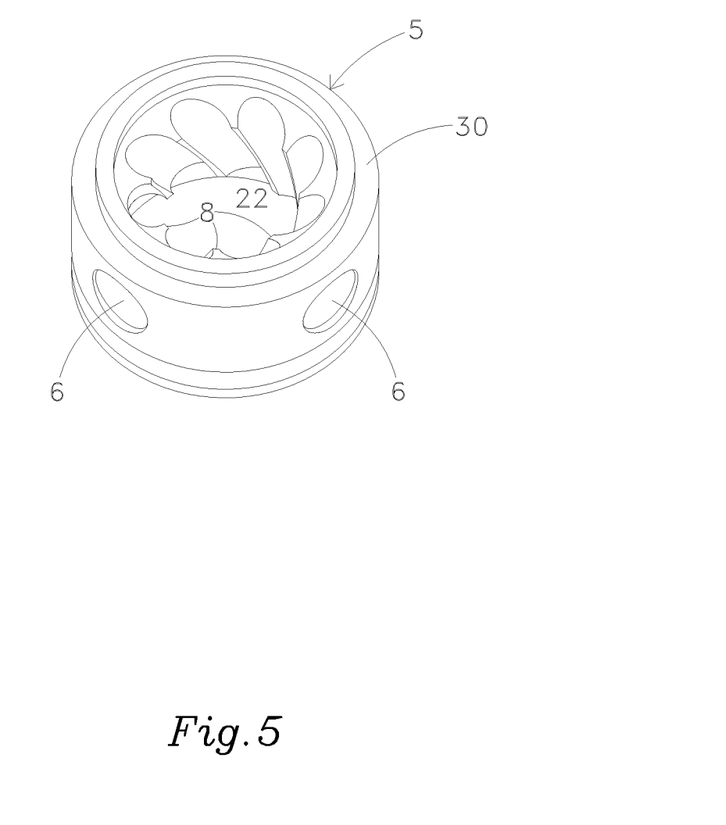
FIG. 5 is an enlarged perspective view of the turbine with magnets imbedded.
Figure 7:
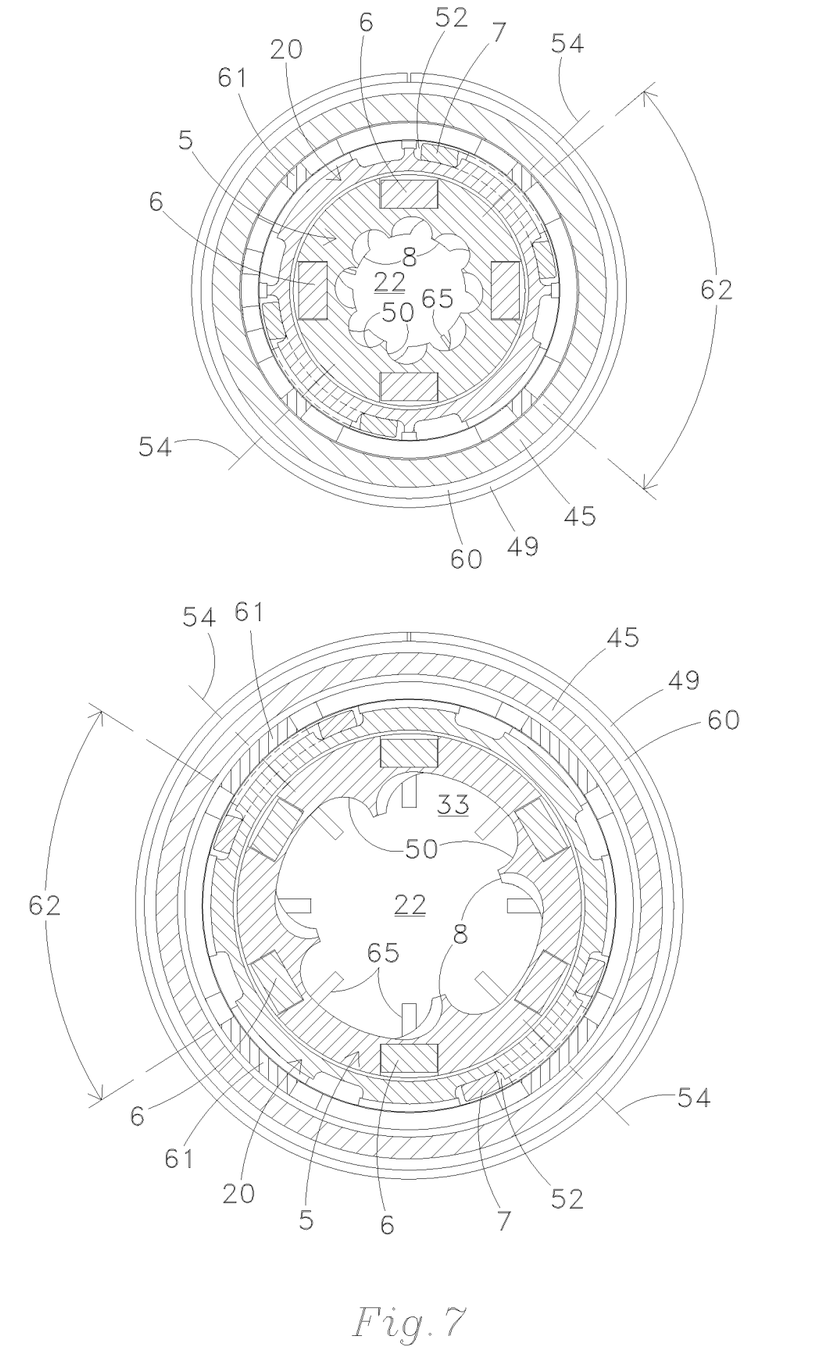
FIG. 7 are cross sectional views of two device of different sizes, each shown cut through the center of the turbine's magnets as viewed toward the inlet end.

The turbine 5 encircles the central waterway 2 and includes vanes 8 that project inwards towards a central axis 9 of the waterway 2. The vanes 8 are formed with a helical or skewed orientation, pitch Alpha α (FIG. 3) with respect to the direction of flow so that flow imparts a rotational moment on each vane, causing the turbine to spin within its housing 20 in one or more bearing races 21. Preferably the vanes do not meet in the center along the central axis 9, leaving a zone 22 of water in the center of the channel that does not encounter the vanes. This arrangement creates a path for gross debris to freely pass through the flow channel without becoming stuck on the vanes (FIGS. 5 and 7). Vane projection is preferably not more than 50% of the distance from the inner surface of the housing toward the centerline of the central waterway.

FIGS. 3 and 7 show how the shape of the leading edges 23 of the vanes 8 (the end of the vane nearest the inlet connection 3) is preferably set at a shedding angle Beta β between 20 and 60 degrees from perpendicular to the axis of the central waterway to shed debris inward (downstream) toward the central axis 9 of the central waterway 2 to pass through central zone 22. Vanes whose leading edges were formed perpendicular to the central axis of rotation, or angled outwards, would tend to catch debris.

Figure 6:
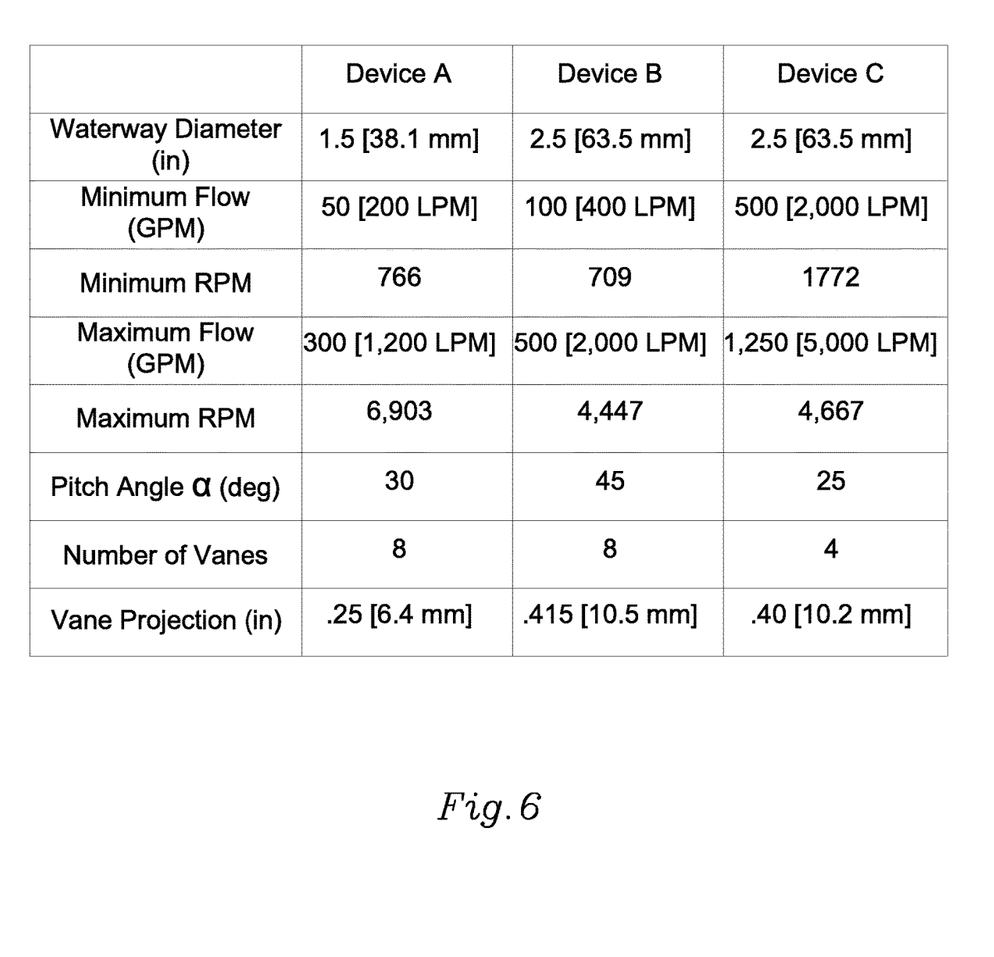
FIG. 6 Is a table of dimensions and variables for various embodiments of the turbine.
Figure 10:
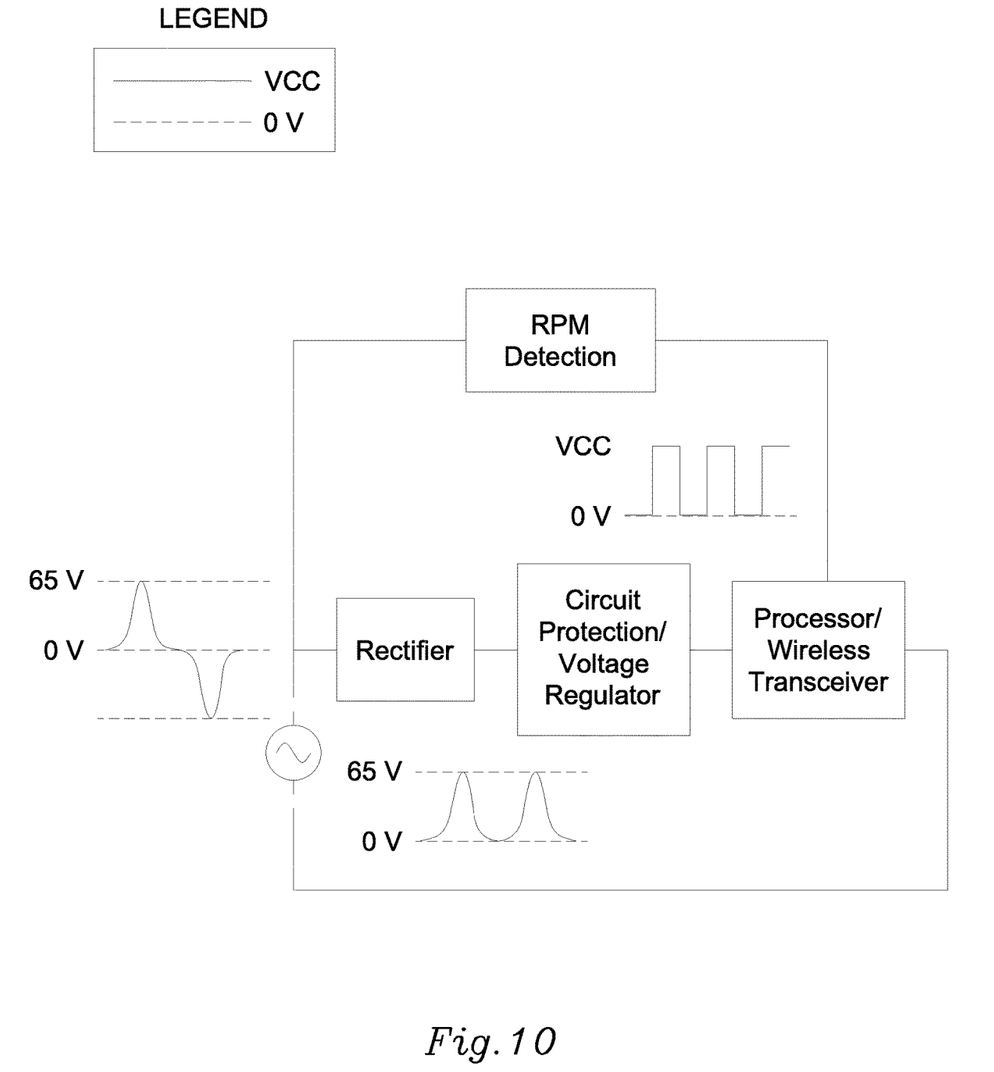
FIG. 10 is a basic block diagram for the electronics.

Vane geometry of the turbine is selected to ensure it spins fast enough at the minimum operational flow to generate enough voltage to power the device, but spins slow enough at the maximum operational flow to prevent excess voltage from overheating and damaging the circuit board's components. Power is rectified and passes through protection circuitry. Excess power is dissipated using a voltage regulator (FIG. 10). If more than one flow range is desired for a given waterway size, then an alternate turbine can be designed for each range. Preferred ranges are shown in FIG. 6.

The turbine's vane geometry is preferably shaped to minimize flow restriction. Too much restricting material partially blocks the central waterway 2 (FIG. 4), increasing undesirable friction loss of the device 1 and putting excess axial load on the front bearing race 30 and the balls 31 of the turbine 5. Ball and race wear increase with increasing axial load, and with increasing peripheral speed, eventually inhibiting consistent turbine speed, resulting in a loss of accuracy. Excessive peripheral speed also results in wear to the balls 31 and the pair of radial races 32 formed within the housing 20 (FIG. 2).

Maximum friction loss through described Device A (FIGS. 6 and 7) is about 1 bar, while loss through Device B is about 0.3 bar, and loss through Device C is about 0.6 bar. These parasitic losses are preferably less than 10% which is considered low enough to be ignored as insignificant in day-to-day firefighting operations. In unrelated fields such as hydroelectric power generation, where the goal may be to extract as much energy from the fluid flow as possible, the extent of friction losses like these are unlikely to be of any concern.

The housing 20 and the balls 31, seen in the exploded view of FIG. 4, are removable for service. Unthreading setscrews 43 enables the cap 44 and cover 45 to be removed. Removal of alignment pins 46 frees outlet connection 4 for unthreading and housing 20 for extraction, giving access to replace worn balls 31, the turbine 6, and the housing 20.

Fluid pressure is contained in the device 1 by a hose gasket 47 and a series of six appropriately sized seals 48. The exterior of the device may be protected from pavement impact and abrasion by a pair of stainless steel bumper rings 49.

Several different iterations of vane 8 geometry were tested to find preferred arrangements for the turbine 5 for different waterway diameters and flow ranges. Variables in geometry consisted of number of vanes, angle of vanes, and size of vanes (projection into the central waterway, and length in the direction of flow).

Test Results and Observations (FIG. 6) Showed

The pitch angle alpha α of the vanes 8 can have a large impact on turbine rpm. At a shallower angle, a change in flow rate makes little change in turbine rpm, but a higher flow rate is needed to start spinning the turbine 5. At a steeper angle, a similar change in flow rate makes a bigger change in turbine rpm, but a lower flow rate is needed to start spinning the turbine.

The number of vanes makes a small impact on turbine rpm, but a large impact on the amount of torque the turbine has. Only a small torque is needed to spin the turbine when polypropylene balls are used for bearing elements, thus the number of vanes can be reduced, as axial loading is minimal.

As waterway diameter increases (FIGS. 6 and 7), a larger turbine diameter is needed, which requires a higher torque for rotation for a given fluid velocity. More vanes add more material into the waterway, which restricts the waterway and increases the pressure loss and axial loads on the balls 31 and the front bearing race 30, but each vane contributes to torque. Therefore for a given waterway size, higher vane counts may be desirable for lower flow ranges, and fewer vanes are needed for higher flow ranges.

The vane width 51 (thickness) makes a small impact on turbine rpm, but a large impact on pressure loss. Narrow vanes create larger vane openings 33 (FIG. 7), with less waterway blockage and lower friction loss. The smaller the vane openings, the more waterway blockage and higher friction loss.

Vanes are preferably cut into the turbine with an end mill which creates a root radius 50 on both sides of each vane.

One or more conductive coils 7 of wire are each mounted to a coil recess 52 on the exterior of a housing 20 that encircles the turbine 5 adjacent the rotational travel path of the magnets 6. Magnetic flux resulting from the repeated movement of magnetic poles passing into and out of each coil induces an electric current within the coil that can be harvested to power electronics within the device. A voltage pulse is generated as each pole passes a coil, and pulses per unit time can be counted using these electronics, with the number of pulses thus being proportional to (and thus a measure of) flow.

Harvested power can also be stored for later use in batteries and capacitors, or be put to immediate use for lighting, audio speakers, wireless communications, diagnostics, powering sensors such as pressure, temperature, acceleration, and global positioning. Power can also be used for receiving input data from other external wired or wireless devices or for sending command data to external devices using wired or wireless communications.

Energy produced can be increased with increasing waterway diameter, and by increasing flow rates. Energy produced increases by increasing number of coils, increasing the number of revolutions of conductor per coil, by increasing the magnet's strength (gauss) and number of magnets, and by installing an even number of magnets in equal circumferential spacing around the turbine. Aspects of the turbine design such as the pitch angle alpha $\alpha$, the number of fins, the size of the central zone 22, and the angle Beta $\beta$ of the vanes (FIG. 3) can also affect production.

At least one coil is required, but there may be benefits from using more. Referring again the FIG. 7, coil voltage is maximized when at least two magnets are embedded in the turbine with alternating polarity in a spaced relationship so that the pole of one magnet enters space adjacent to a first side of a coil at the same time another magnet with opposite polarity exits a second (opposite) side of the coil. The cylindrical magnets have poles on opposite ends of the cylinder. Turbine rotation is preferentially clockwise as viewed in FIG. 7 so as to impart a slight tightening torque on the threaded inlet connection. Magnets are preferably spaced to enter and exit coils simultaneously, so as to produce a stronger electromagnetic field (EMF), hence a higher voltage.

Figure 9:
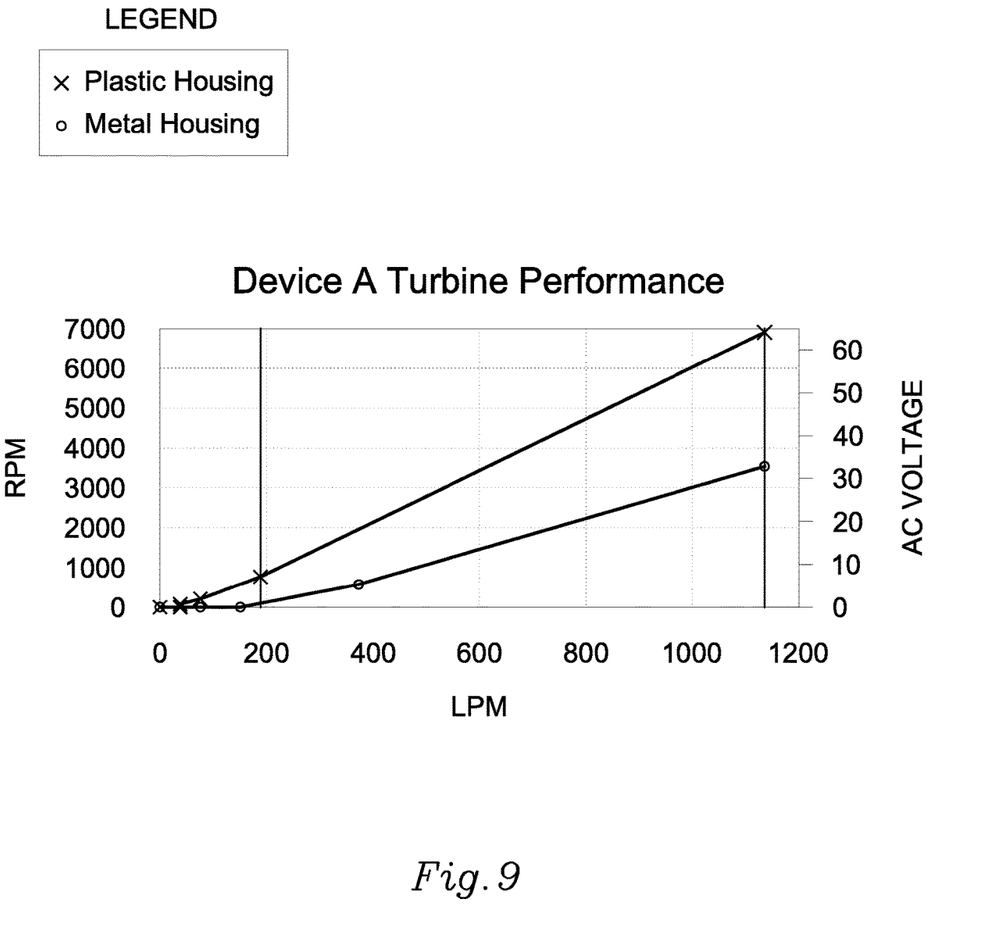
FIG. 9 is a graph comparing the performance of one device with an aluminum housing and a comparable device with acetal housing.

Voltage from a coil is proportional to flow when the turbine is rotating (FIGS. 9 and 10). At zero flow the turbine does not rotate and produces no voltage. As flow increases the turbine will begin to rotate, dependent on turbine geometry, fiction, and debris in the ball races. At some flow the turbine always rotates reliably, and a proportional (linear) relationship between flow rate and voltage commences, with voltage increasing to its maximum at a maximum rated flow Minimum operating flow published for acquiring flow data is preferably somewhat greater than the minimum reliable flow. The number of coils and wiring can be selected to ensure adequate voltage for the microprocessor's voltage regulator at some threshold flow where the turbine always rotates freely. Multiple coils can be wired in series resulting in voltage being added, whereas coils wired in parallel will result in current being added. The coils produce an AC voltage (alternating current) which can be rectified and conditioned for use by the pertinent electronics, which typically have a nominal operating voltage is 5 VDC.

Energy production for a given combination of coil size/number of coils, magnet strength/number of magnets, and turbine configuration is maximized as the radial distance between the magnet poles and the coils when the magnet passes under a coil is minimized Maximum theoretical power would happen at zero space between magnet and coil but restraining pressure within the device makes it useful to intersperse a wall section between the magnet and the coil. Magnetic strength is usually approximated as an inverse cubic function, so small increases in this distance can result in a large reduction of generating capacity.

Figure 8:
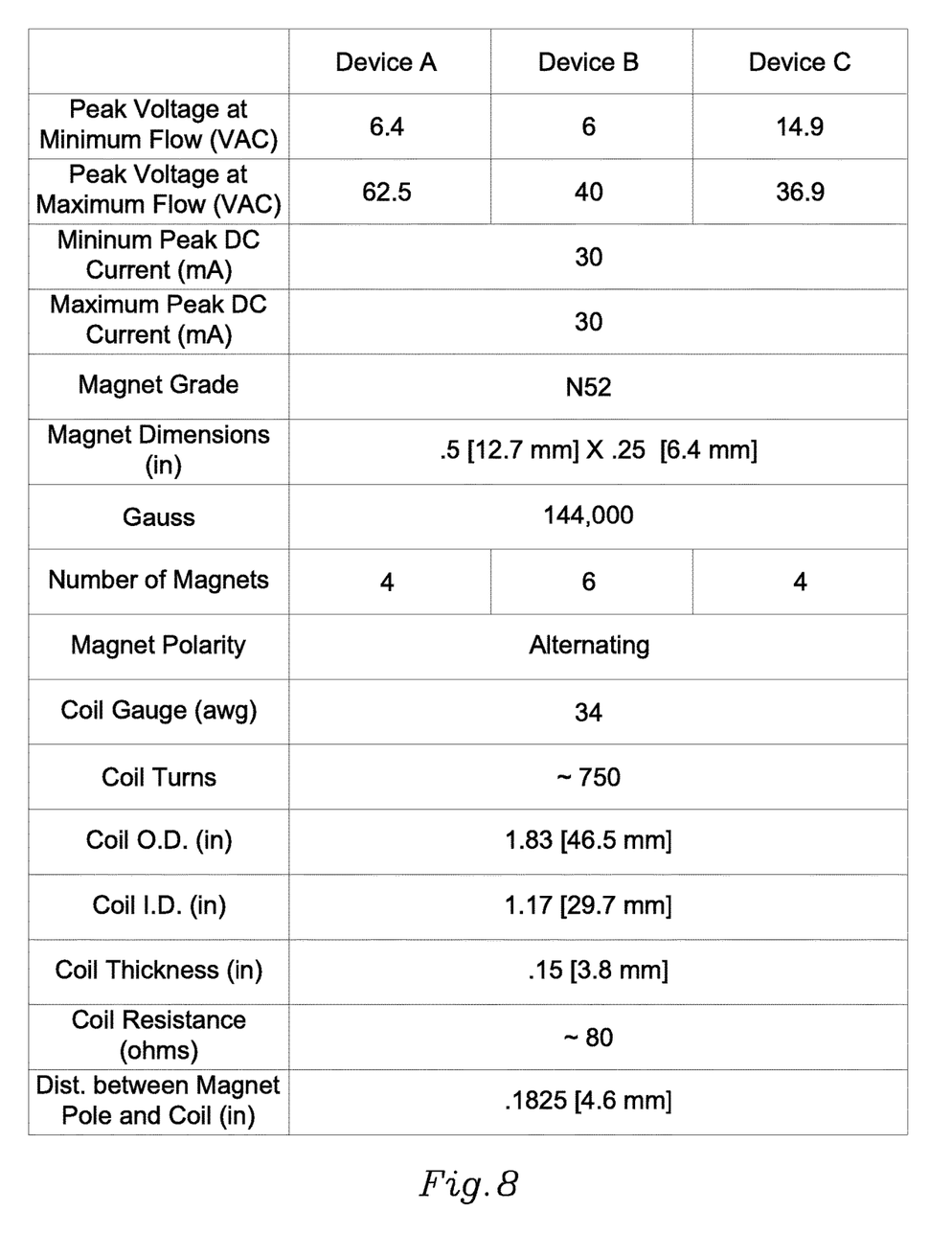
FIG. 8 is a table of dimensions and variables for various embodiments of the magnets and coils.

The coils shown here have coil axes that are radial to the central axis 9 of the central waterway 2 and are spaced circumferentially about the central waterway at an axial position that is radially outward from the magnets 6 on the turbine 5. It was found (FIGS. 7 and 8) that embedding each coil 7 in a coil recess 52 formed on the exterior of a housing 20 could position the coil at only a small distance 56 from the magnet's pole, while still maintaining sufficient housing 20 strength to safely contain fluid pressurized within the housing's interior. Coils can be wound onto a cylindrical spool and then formed to mount between the outside curvature of the housing and the bottom of the recess. Housing strength and energy output are competing goals to a workable solution when fluids are highly pressurized as in firefighting.

A housing made from lightweight aluminum would be ideal for strength and portability, but magnets moving inside a full aluminum housing would generate eddy currents that could significantly impact the rotational speed and limit the power generated.

Eddy currents cause drag that restricts free movement. This drag is greatest in metals with high free electrons, as is the case with the lightweight aluminum typically preferred for portable firefighting equipment. The amount of drag is also a function of the distance between the magnet and the metal according to an inverse cubic relation.

Attempts at harvesting usable power levels in firefighting equipment with an aluminum housing showed that although flow was proportional to velocity, four magnets 6 (FIGS. 8 and 9) spaced closely to two coils 7 were insufficient, due to eddy current effects, to power the desired electronics. When the aluminum housing was replaced with a non-metallic (plastic) housing, turbine speed, voltage, and thus power were about doubled. In settings like this, eddy currents therefore appear to pose a significant frictional drag on turbine rotation using the conventional aluminum material for firefighting equipment.

Use of a non-metallic material like plastic would solve that problem, but cause another one. Plastics don't have the strength to withstand hydrostatic testing requirements of 62 bar (900 psi), cold exposure requirements of −25 C, and rough usage impact requirements needed for firefighting appliances per the National Fire Protection Association (NFPA). While plastic eliminates eddy currents and maximizes power generation, its strength and impact resistance in cold conditions is far less than aluminum, hence it is not strong enough on its own to form the main structural element of the device.

To solve the competing problems, the invention provides a main structural element called a cage 60 that supports a housing 20 made from acetal plastic (POM). This plastic exhibits a preferred balance of strength, toughness, wear, machinability, availability, and cost for housing manufacture.

The housing 20 also serves to protect the coils 7 and circuit boards 24 from moisture contamination, and it can be structured to include low-wear bearing races 32 to support the turbine's rotation on its bearing balls 31 (FIGS. 2,3,4, and 7).

The bearing balls 31 are preferably made from polypropylene, which is lower density than balls made from almost all other metals and plastics. This reduces the radial loads of balls spinning at high peripheral speed to further reduce wear of the balls and their races. Polypropylene also has good abrasion resistance, which helps limit wear from the rust, sand, and dirt particles typical of firefighting water.

A metallic inlet connection 3 receives pressurized fluid at the inlet end. The fluid flows through the device, exiting at an outlet connection 4. These end fittings are mounted on the lightweight, high strength aluminum cage 60 which is the main structural element of the device. The connections may be of the type known as National Hose Threads per NFPA 1962, ISO 228, or of quick connect, flanged, or any other types known in the art.

The cage 60 serves to restrain axial forces from water pressure within the housing 20. If the cage were formed so as to completely surround the housing's circumference, then significant eddy currents could be created by the magnets resulting in slower turbine speed and a lower voltage for every given flow. Therefore, the cage is preferably formed with a series of windows that reduce eddy current drag. The cage is at a greater radial distance than the housing with respect to the poles of the magnets, so the detrimental eddy current effects from a metallic cage would be less than for a metallic housing.

The cage 60 serves to restrain radial expansion of the housing 20 to prevent fluid pressure from rupturing the housing at each coil recess 52. To achieve this, the illustrated cage has reinforcing arms 61 that bridge across the portions of housing inside the center of each coil 7. The reinforcing arms 61 are set at a radial distance from the axis of the central waterway. The preferred embodiment is for each coil to be reinforced in its center by one cage arm. Space between two adjacent arms 61 creates a window 62 that eliminates detrimental effects of eddy current in that region. Arm width can be kept modest, assuring adequate strength while maximizing width of the windows. The illustrated reinforcing arms are made of a material at least as strong as 6061-T6 aluminum, and have a collective width—near the axial position of the turbine—that does not exceed 30% of the circumference of the device at the radial distance where the arms are set. At that important axial position, the circumferential width of each individual reinforcing arm is preferably no more than the radius of a coil.

Although arms could alternatively be formed using a set of bolts to restrain the inlet and outlet connections 3 and 4, the resulting design could become larger in diameter than needed and each fastener head could serve as an undesirable catch point when a hose is dragged about during normal use.

The illustrated cage also serves to secure the circuit boards 24, the inlet connection 3, the outlet connection 4, to hold the cover 45, to mate with all the seals 48, and to house a stream straightener 64.

The optional stream straightener 64 can serve to condition turbulence from upstream disturbances such as valves, Tees, and elbows so as to improve accuracy. In the illustrated straightener, a series of fins 65 each radiate from the inside diameter of the straightener towards the central zone 22. The leading edges of the fins are angled inwards towards the central axis 9 to shed debris in a similar way to the turbine's vanes 8.

The illustrated device has a waterproof chamber 66 that encloses the coils 7 and the circuit boards 24. It is formed by a cover 45 that is installed over the housing 20, and is sealed using O-ring seals 48. If the cover were formed from metal, then eddy currents could be generated, causing the turbine to spin slower and produce a lower voltage for every given flow. However, the cover is at a greater radial distance from the magnets than both the cage and the housing, so the detrimental eddy current effects from a metallic cover would be less than for a metallic cage or housing.

Nonetheless, the cover is preferably made from plastic such as CPVC to avoid creating yet another source of eddy current loss and to provide a safe space for wireless communication with a transceiver 70 in a watertight environment, without creating damage prone external antenna projections. CPVC has lower strength but better impact resistance than acetal plastic, making it ideal for the cover. The cylindrical shape of the cover allows the wireless signal to be transmitted through the housing from any direction with the widest range possible to insure communications no matter which way the device faces.

The integrity of the seals 48 can be tested by pressurizing the waterproof enclosure through a test port. After testing, the port can be subsequently shut with a test plug 71. The coils can be secured in their mounted positions in the housing by a cable tie 72 and soldered to the circuit boards 24. The circuit boards can be made as smaller segments joined by ribbon cables to fit compactly into chamber 66 (FIGS. 3 and 4).

Various levels of haptic feedback are obtained by magnet spacing, fin geometry, and bearing clearances enabling one to tell by feel if the turbine is rotating. With this feature, the need to power externally visible indicator lights or displays can be avoided.

Although the illustrated device 1 does not require batteries, batteries can be added to the electronics to power the circuit boards 24 and the transceiver 70 for brief periods when the turbine 5 is not rotating. For example, to establish a wireless link before commencing flow operations, to retain a wireless communication link during normal start/stop operation of fighting fires, for wireless diagnostics, and to update the electronics within the device with firmware upgrades.

The device can be equipped with a charging port, or include a power cable if desired, but these pose a water infiltration concern. So no external power source or wires are provided in the preferred embodiment.

The device 1 can be wirelessly paired to a smartphone 80 using Bluetooth or cellular communication protocols (FIG. 3). While cellular data has a far wider transmission distance, it also requires far more power than Bluetooth and entails undesirable monthly data fees. The wireless communication may also be designed for other frequency bands and protocols for pairing with other radio formats, however these bands render it incompatible with current wireless communications found on smartphones typically carried by firefighters in the normal course of their duties. Data sent from the device to a smartphone is easily uploaded into the cloud for further manipulation (i.e., geospatial time based totalization and reporting), and for remote viewing capability around the globe in near real time or at a later date.

The device electronics preferably include data storage capability to record flow data during operational periods without wireless pairing. Data acquired during these periods can be automatically uploaded during subsequent paired periods.

Figure 11:
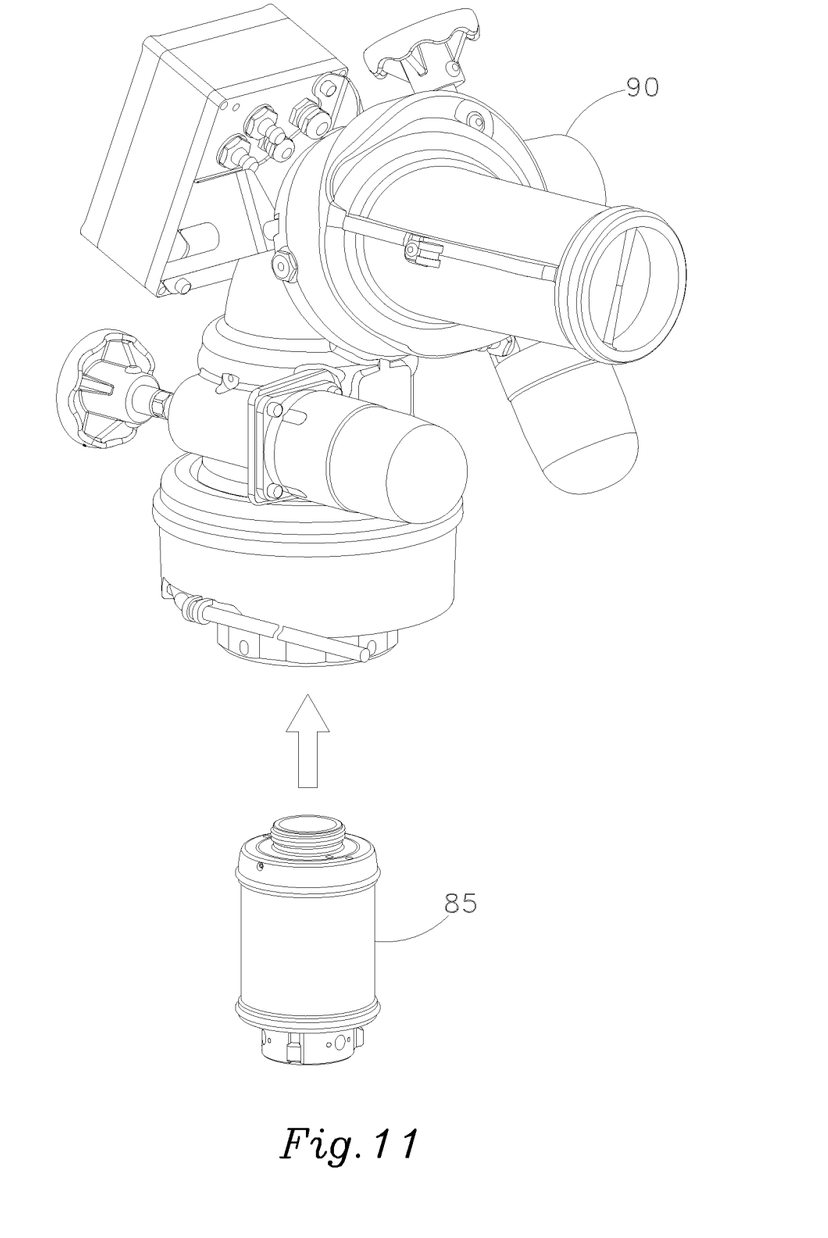
FIG. 11 is an isometric view showing an embodiment of the device built into a water cannon.

FIG. 11 illustrates that an embodiment of the device 85 that has the same housing, turbine, and cage, may be integrated permanently into the waterway of a firefighting monitor 90, a valve, a nozzle, a pump manifold, piping such as may be found in a fire engine of foam system, or any other fire protection system.

The invention claimed is:

1. A flow measuring device that has:
a non-metallic housing that has an inner surface through which a fluid flows along an axis of a central waterway;
an annular turbine that is arranged at an axial position along the central waterway, surrounds the central waterway, and rotates about the axis of the central waterway;
a set of vanes that extend inwardly from a circumferential wall of the turbine into the central waterway, and are set an angle at which the flow of liquid through the central waterway causes the turbine to rotate without reducing the pressure of the fluid through the pathway by more than 10%;
a set of magnets that are spaced circumferentially about the turbine;
a set of coils that are mounted to the housing, have coil axes that are radial to the axis of the central waterway, and are spaced circumferentially about the central waterway at an axial position that is radially outward from the magnets on the turbine; and
a set of circumferentially spaced reinforcing arms, one for each coil, the circumferential width of each reinforcing arm near the axial position of the turbine being no more than the radius of the coil.

2. The flow measuring device of claim 1, that also comprises:
a transmitter or transceiver that is powered by electric current that is generated by rotation of the magnets with respect to the coils when fluid flows through the central waterway, and broadcasts a signal that indicates the volume of flow through the pathway.

3. The flow measuring device of claim 2, that also comprises:
a plastic cover that protects the transmitter or transceiver from liquid in a firefighting environment without providing a medium in which generation of eddy currents reduces the efficiency of electrical generation of the device by more than 10%.

4. The flow measuring device of claim 1, in which the housing is made at least in part of plastic, has recesses in which the coils are mounted, and has an internal race in which outer portions of the turbine rotate.

5. The flow measuring device of claim 1, in which rotation of the turbine about the central axis of the waterway is supported by plastic ball bearings in a race within the housing.

6. The flow measuring device of claim 1, in which the vanes extend no more that 50% of the distance from the inner surface of the housing toward the centerline of the central waterway.

7. The flow measuring device of claim 1, in which the leading edge of the vanes is set at a shedding angle of between 20 and 60 degrees from perpendicular to the axis of the central waterway.

8. The flow measuring device of claim 1, in which the coils are arranged so that all parts of the coil are spaced at the same distance from the axis of the central waterway.

9. The flow measuring device of claim 1, in which:
the circumferentially spaced reinforcing arms are set at a radial distance from the axis of the central waterway, are made of a material at least as strong as 6061-T2 aluminum, and have a collective width—near the axial position of the turbine—that does not exceed 30% of the circumference of the device at the radial distance where the arms are set.

10. The flow measuring device of claim 1, in which the reinforcing arms are spaced circumferentially in alignment with the axes of each coil.

11. A firefighting device that comprises the flow measuring device of claim 1, in which the reinforcing arms are sufficiently strong to enable the flow measuring device to withstand hydrostatic pressure of 900 PSI in the central waterway.

12. A firefighting device that comprises the flow measuring device of claim 1, in which the circumferentially spaced reinforcing arms are part of a cage on which a standard fire hose fitting is mounted.

13. A firefighting device that comprises the flow measuring tool of claim 1, and also comprises:
a transmitter or transceiver that is powered by electric current that is generated by rotation of the magnets with respect to the coil when fluid flows through the central waterway, and broadcasts a signal that indicates the volume of flow through the pathway.

14. The flow measuring device of claim 1, in which rotation of the magnets with respect to the coils generates electricity for later use.

15. The flow measuring device of claim 14, in which the device also comprises an electric storage device in which the generated electricity is stored for later use.

\* \* \* \* \*

UNITED STATES PATENT AND TRADEMARK OFFICE
CERTIFICATE OF CORRECTION

| | |
|---|---|
| PATENT NO. | : 11,933,649 B2 |
| APPLICATION NO. | : 17/599918 |
| DATED | : March 19, 2024 |
| INVENTOR(S) | : Travis Bavar et al. |

It is certified that error appears in the above-identified patent and that said Letters Patent is hereby corrected as shown below:

On the Title Page

At item (57), in Column 2, under "ABSTRACT", Line 4, "reduce" should be -- rotate without reducing --.

In the Specification

At "BACKGROUND OF THE INVENTION", in Column 1, Line 27, delete "to".

At "BACKGROUND OF THE INVENTION", in Column 3, Line 37, "knows" should be -- know --.

At "DETAILED DESCRIPTION", in Column 6, Line 50, "6" should be -- 5 --.

In the Claims

At Column 12, Line 16, "that" should be -- than --.

Signed and Sealed this
Fourteenth Day of May, 2024

Katherine Kelly Vidal
*Director of the United States Patent and Trademark Office*